(12) United States Patent
Bonfiglio et al.

(10) Patent No.: US 6,892,022 B1
(45) Date of Patent: May 10, 2005

(54) STORING AND RETRIEVING ENCODED DATA STREAM WITH SPECIFIED TIME OF DELIVERY ON A HARD DISK

(75) Inventors: Gaetano Bonfiglio, Fremont, CA (US); Kurusamy Muniappan, San Jose, CA (US); Trung Nguyen, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/539,491

(22) Filed: Mar. 30, 2000

(51) Int. Cl.[7] ................................................ H04N 5/76
(52) U.S. Cl. ........................ 386/65; 386/98; 386/111; 348/423.1
(58) Field of Search .................. 386/1, 33, 40, 386/39, 95, 98, 111, 112, 12 C, 65; 348/423.1 C; 370/389, 39 C, 395, 546, 503, 509, 514, 516; 380/8, 26, 51; H04N 5/76, 9/79, 5/781

(56) References Cited

U.S. PATENT DOCUMENTS

| | | | | |
|---|---|---|---|---|
| 5,521,922 A | * | 5/1996 | Fujinami et al. | 370/543 |
| 5,768,536 A | | 6/1998 | Strongin et al. | 395/200.77 |
| 6,031,960 A | * | 2/2000 | Lane | 386/68 |
| 6,404,711 B1 | * | 6/2002 | Kato | 369/47.31 |
| 6,519,411 B1 | * | 2/2003 | Sugimura et al. | 386/65 |

* cited by examiner

Primary Examiner—Thai Tran
(74) Attorney, Agent, or Firm—David M. Sigmond

(57) ABSTRACT

In an embodiment of the invention, a method is provided for storing multimedia information to a medium. In another embodiment, a method is provided for retrieving multimedia information stored on a medium.

75 Claims, 6 Drawing Sheets

STORING AND RETRIEVING ENCODED DATA STREAM WITH SPECIFIED TIME OF DELIVERY ON A HARD DISK

RESERVATION OF COPYRIGHT

This patent document contains material subject to copyright protection. The copyright owner has no objection to the facsimile reproduction by anyone of the patent document, as it appears in the U.S. Patent and Trademark Office patent files or records, but otherwise reserves all copyright rights whatsoever.

BACKGROUND OF THE INVENTION

1. Field of Invention

The present invention relates to certain types of apparatus and methods for storing multimedia information to and retrieving multimedia information from a storage medium, such as, for example, a hard disk, magnetic tape, optical disk, and a writable CD.

2. Description of Background Information

Multimedia information is encoded and packetized using an accepted standard. The multimedia information is encoded and packetized for transmission via a transport stream from a source to a destination for decoding and playback. Some of the packets include timing information, which is critical for playback. Typically, the data is transmitted from the source to a destination over a channel having a constant delay. Due to the constant delay, the temporal information carried in the transport stream is preserved.

Media are increasingly utilized and applied for storing and playing video programs in digital form. Such media may include, for example, a hard disk, magnetic tape, optical disk, a writable CD, and any other device capable of storing digitized multimedia information. For example, industries, such as television, movie, and music industries are increasingly employing the use of hard disks. Applications, such as MPEG-2, transform video and audio contents forming a transport stream (TS) of packets of information.

There are many types of packets of information, each identified by a unique identifier. Some of the packets may contain a Program Clock Reference (PCR) field, which carries the timing information that allows the decoder clock to periodically resynchronize components of the video/audio with the assistance of additional time stamps; such as a decode time stamp and a presentation time stamp. The PCR field allows the decoder clock to track the encoder clock so as to not underrun or overrun the decoder's buffer. Timing information is carried only in the PCR packets, which occur at time intervals not exceeding 100 milliseconds.

When the TS is delivered through a constant delay transmission channel directly from the source, such as an MPEG-2 TS encoder 102, to a receptor, such as an MPEG-2 decoder 104, there is no problem in reconstructing the video/audio contents. See FIG. 1. In this arrangement, the decoder extracts the PCR values in the packets and generates the clock using circuitry to form a phase locked loop. The temporal relationship arising from the direct connection allows the receptor to recover the original clock. The intervening packets of information that do not have PCR fields (non-PCR packets) do not interfere with the timing information since the decoder decodes the encoded packets as it receives each packet.

However, when there is no direct connection between the source and the receptor and no constant delay therebetween, it may be impossible to recover the original clock. One such instance is when the video is stored on a hard disk for playback at a later time. FIG. 2 generally depicts the movement of a TS in such a system. For instance, the encoder 102 dictates the arrival of the packets for storage on the hard disk drive 202. The hard disk drive 202 incorporates a timing generator having the clock rate of the encoder used to generate PCR values. The storage apparatus monitors the output of the timing generator and outputs a packet when the PCR value in the packet equals the value in the timing generator. However, for non-PCR packets, there is no timing value for comparison. Therefore, the decoder does not know when to output these non-PCR packets. This may result in an incomplete or fuzzy video or audio playback. Other problems that may arise are loss of color and "jumpy" pictures.

Thus, there is a need for a method and apparatus that allows for the storage of digital packets and for accurate retrieval of the stored information with a certain required timing.

SUMMARY

In an embodiment of the invention, a method is provided for storing multimedia information to a medium. Encoded packets of the multimedia information are received. The encoded packets include timing information in a subset of the encoded packets arriving at least every predetermined time period. Storage timing fields are added to respective at corresponding encoded packets. A value from a timing generator is stored into a given storage timing field when the corresponding encoded packet does not include the timing information. A value from the timing information of the corresponding encoded packet is stored into the given storage timing field and the value in the timing generator is reset when the corresponding encoded packet includes the timing information. The encoded packet is then stored onto the medium.

In another embodiment, a method is provided for retrieving multimedia information stored on a medium. A signal recorded on the medium is read, the signal representing encoded packets of multimedia information. A respective corresponding encoded packet includes a given first timing information in a storage timing field. The given first timing information in the storage timing field is compared to a timing value from a timing generator.

The given storage timing field from the respective corresponding encoded packet is removed and the respective corresponding encoded packet is output to a decoder when the comparing of the first timing information and the timing value indicates that a respective transmission time has been reached.

BRIEF DESCRIPTION OF THE DRAWINGS

The above and other objects, features, and advantages of the present invention are further described in the Detailed Description which follows, with reference to the drawings by way of non-limiting exemplary embodiments of the invention, wherein like reference numerals represent similar parts of the present invention throughout the several views and wherein.

DETAILED DESCRIPTION

Figure 1:
FIG. 1 is a prior art depiction of an arrangement for decoding with a constant delay using phase locked loop circuitry.
Figure 2:
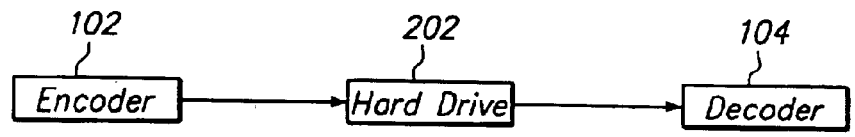
FIG. 2 is a depiction of an arrangement for storing multimedia information to and retrieving multimedia information from a hard disk drive.
Figure 3:
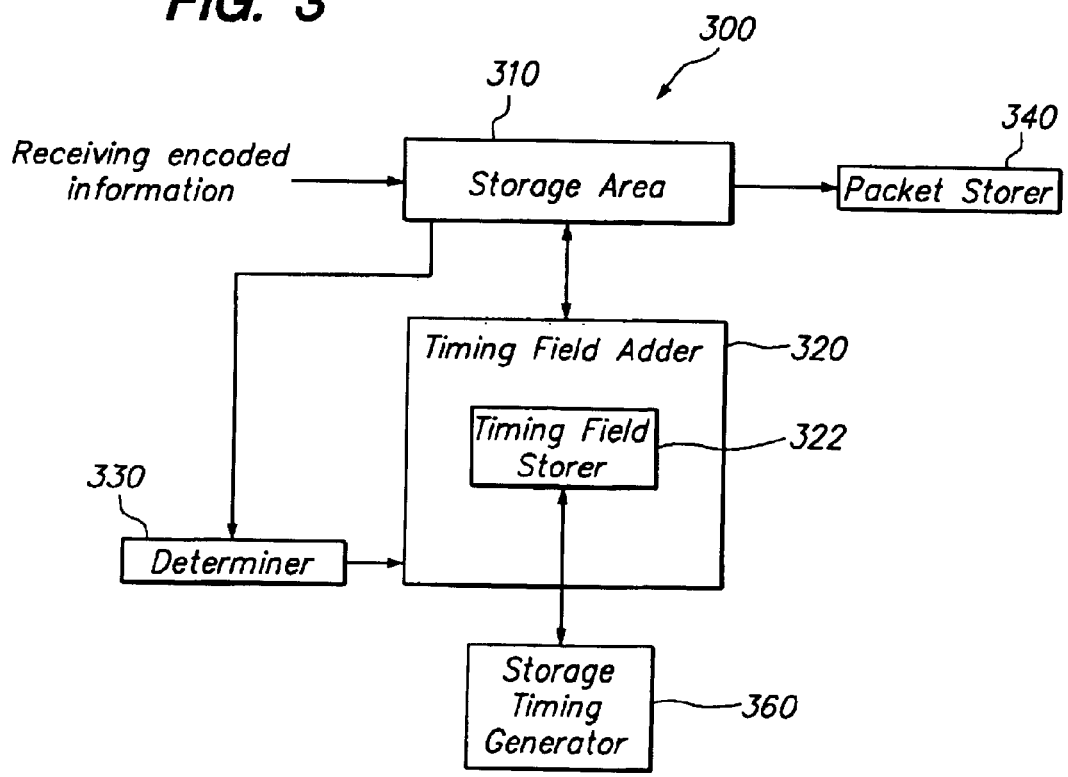
FIG. 3 is a system diagram of one embodiment of an apparatus for storing information on a medium.

Referring now to the drawings in greater detail, FIG. 3 generally depicts a storing apparatus 300, in accordance with one illustrated embodiment of the present invention. The apparatus 300 comprises a storage area 310, a timing field adder 320, a determiner 330, a packet storer 340, and a storage timing generator 360. Timing field adder 320 further comprises a timing field storer 322. In the illustrated embodiment, the storage area may be, for example, a computer memory, and the timing field adder 320, the determiner 330, and the packet storer 340, may be implemented in software or firmware executing within a processor included in the apparatus; however, these elements may, instead, be implemented in hardware.

Figure 4:
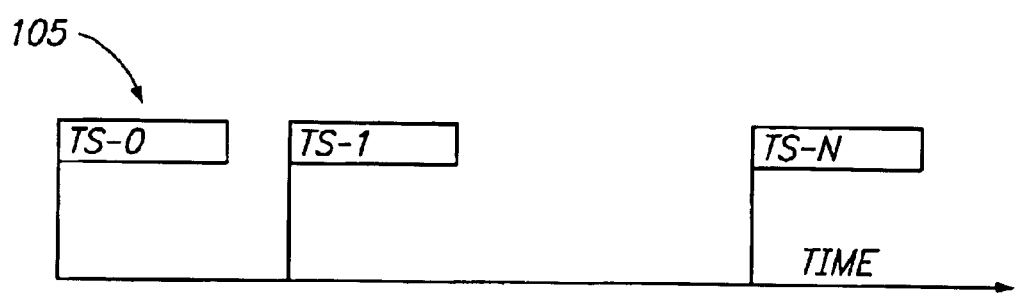
FIG. 4 illustrates the packets of information over time as they enter the storing apparatus.

Storage area 310 receives a packet of incoming encoded multimedia information. The format of the incoming information can be arranged to follow different specifications, such as MPEG-2. FIG. 4 illustrates the receipt of packets 105 by storage area 310 over time. Over the course of this detailed description, MPEG-2 is used by way of example and is not intended to limit the application of the present invention.

Figure 5:
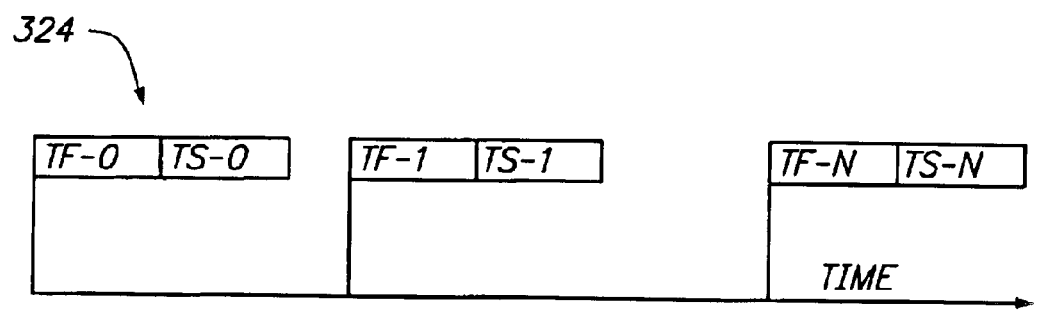
FIG. 5 illustrates the packets of information with storage timing fields added by the timing field adder.

Timing field adder 320 adds a time field 324 to each packet 105 of information received in storage area 310. The time field 324 includes a 42 bit timing value. FIG. 5 illustrates the addition of time fields 324 to each of the packets 105 over time in the storage area 310.

Determiner 330 examines each packet 105 of information received in storage area 310 to determine whether packet 105 contains timing-information, for example, a PCR field. Timing field storer 322 stores a value of the timing information in packet 105 in corresponding time field 324. If determiner 330 finds packet 105 to contain the timing information, time field storer 322 resets the value of storage timing generator 360 to the value of the timing information.

If determiner 330 finds packet 105 to not contain timing information, time field storer 322 enters a value from storage timing generator 360 in corresponding timing field 324. Once timing field 324 is written, packet storer 340 stores the encoded packet 105, including the corresponding timing field 324, to a medium. In the illustrated embodiment, the medium may comprise any mechanism that can store data for a significant period of time, such as, for example, a floppy disk, hard disk, CD/RW, or optical disk.

Figure 6:
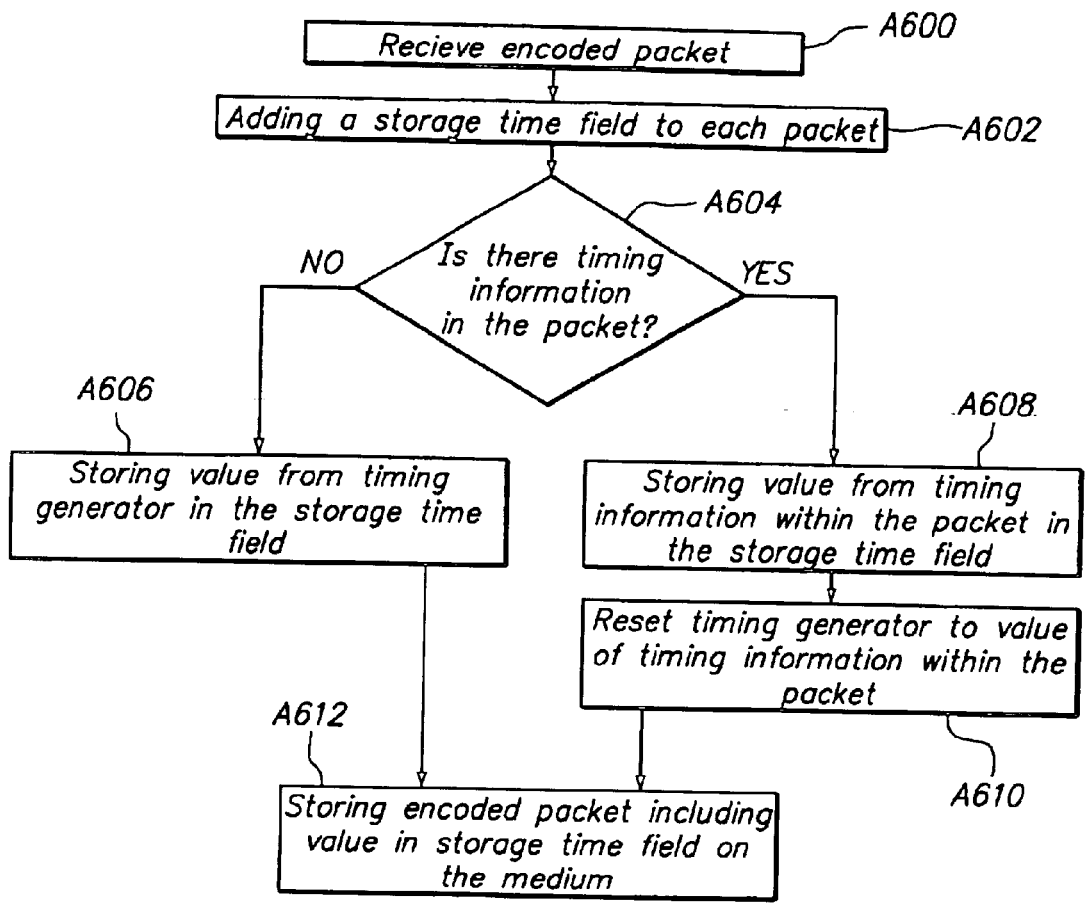
FIG. 6 depicts a flow chart of the method of storing information on a medium using one embodiment of the present invention.

FIG. 6 is a flow chart illustrating an embodiment of a method for storing the packets in the medium. In a first act A600, a packet 105 of information is received in storage area 310. In a second act A602, timing field adder 320 adds timing field 324 to packet 105 received in storage area 310. In a third act A604, determiner 330 reviews packet 105 to determine whether packet 105 contains timing information. Depending on the finding of determiner 330 in act A604, the next act may take one of two paths, an act A606 or acts A608 and A610. If determiner 330 finds in act A604 that the packet does not contain timing information, timing field storer 322 stores a value of storage timing generator 360 in corresponding timing field 324 of packet 105 in next act A606. If determiner 330 finds timing information in packet 105 in act A604, timing field storer 322 stores the value from the timing information in timing field 324 of packet 105 in next act A608. At the same time as or in sequence with act A608, act A610 is performed to cause, time field storer 322 to reset storage timing generator 360 with the value from the timing information in packet 105. Finally, in act A612, the encoded packet 105, including timing field 324 with the stored value from act A604 or A606, is stored on the medium. Acts A600 through A612 are repeated for each packet 105 of information until all of the information is stored in the medium.

Figure 7:
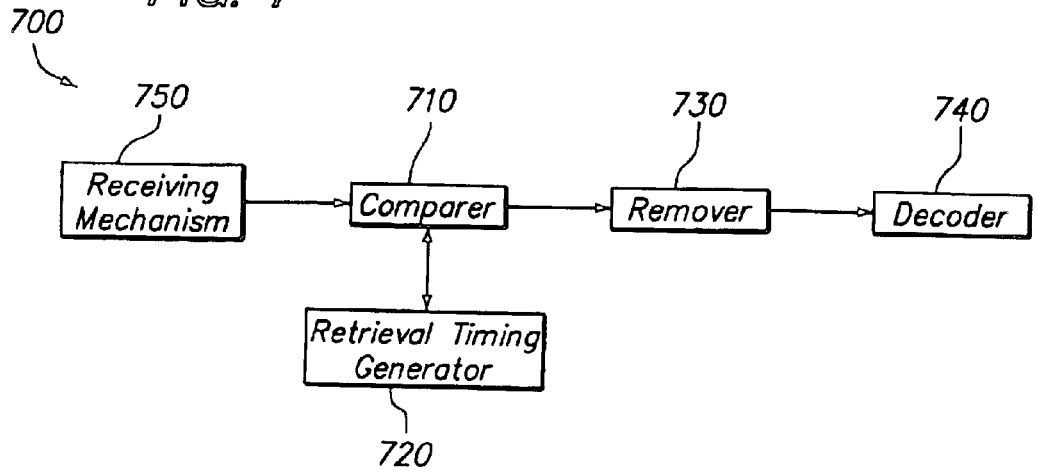
FIG. 7 is a system diagram of an embodiment of an apparatus for retrieving information stored on a medium.

FIG. 7 illustrates another embodiment of the present invention, a retrieving apparatus 700 for retrieving information stored in the medium. Retrieving apparatus 700 comprises a comparer 710, a retrieval timing generator 720, a remover 730, a decoder 740, and a receiving mechanism 750. In the illustrated embodiment, the receiving mechanism 750 may be, for example, a computer memory, and the comparer 710 and the remover 730 may be implemented in software or firmware executing within a processor included in the apparatus 700; however, these elements may, instead, be implemented in hardware.

Retrieval timing generator 720 maintains an internal timing clock over the course of the retrieval method. Retrieval timing generator 720 may comprise an appropriate timing mechanism capable of being reset. Receiving mechanism 750 receives a packet 105 of information read from a medium. Comparer 710 compares the value in the timing field 324 with the value in retrieval timing generator 720. The timing field 324 includes a 42 bit timing value. Remover 730 removes corresponding timing field 324 from packet 105 when comparer 710 finds the transmission time to be appropriate and outputs packet 105 to decoder 740. In the illustrated embodiment, decoder 740 is an MPEG-2 decoder, however, decoder 740 can be any decoding mechanism appropriate for decoding the encoded information.

Figure 8:
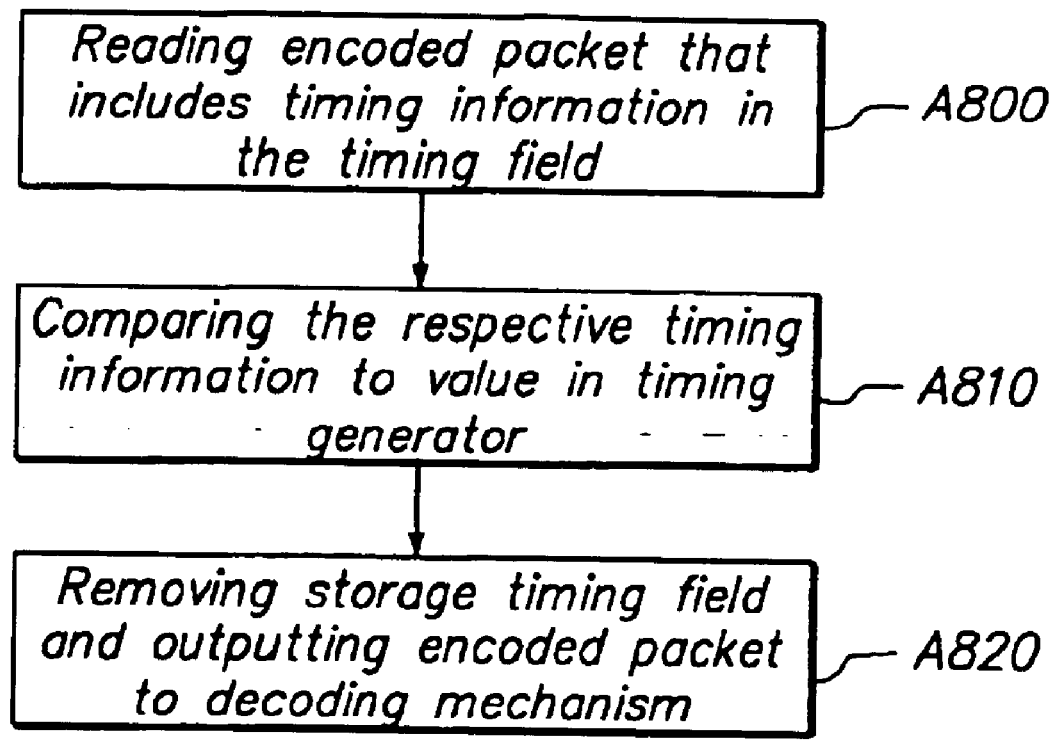
FIG. 8 depicts a flow chart of a method of retrieving information stored on a medium.

FIG. 8 illustrates an embodiment of a method for retrieving multimedia information stored in the medium. In a first act A800, receiving mechanism 750 receives packets 105 of encoded information read from a medium. In this embodiment, packets 105 are read and received by receiving mechanism 750 in a "first in, first out" manner such that packets 105 received by receiving mechanism 750 from the medium first are the first to leave receiving mechanism 750.

In a second act A810, comparer 710 compares the values in timing field 324 and retrieval timing generator 720. When comparer 710 finds the values in timing field 324 for a certain packet 105 and retrieval timing generator 720 to be equal or to be within a predetermined value earlier than the value of the retrieval timing generator 720, remover 730 at act A820 removes timing field 324 from the certain packet 105 and outputs the packet to decoder 740. If the clock rate of the storage timing generator 360 is faster than the encoder clock rate, all packets between two packets having timing information could not be delivered before the next packet with timing information arrives. Therefore, it is preferable for storage timing generator 360 to release the packets at a predetermined amount earlier than the stored value in timing field 324.

Figure 9:
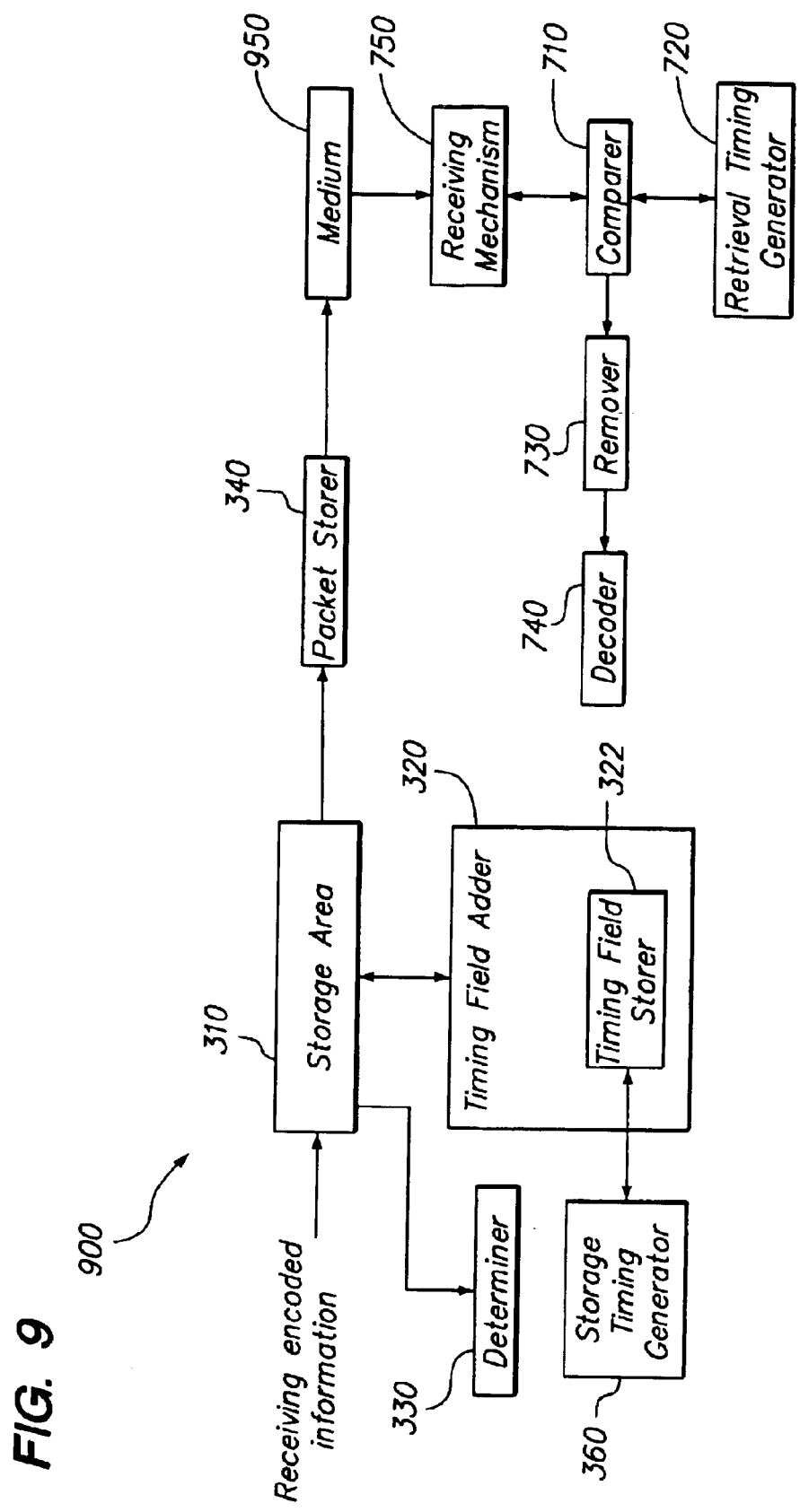
FIG. 9 depicts a system diagram of an embodiment of an apparatus for storing information on a medium and retrieving information stored on a medium.

FIG. 9 illustrates one embodiment of a storing and retrieval apparatus 900 for storing multimedia information in an appropriate medium and for retrieving the stored information for playback with a certain level of accuracy. Apparatus 900 includes a storage area 310, a timing field adder 320, which includes a timing field storer 322, a determiner 330, a packet storer 340, a storage timing generator 360, a medium 950, a comparer 710, a retrieval timing generator 720, a remover 730, a decoder 740, and a receiving mechanism 750.

As mentioned earlier, in the illustrated embodiment, the storage area 310 may be, for example, a computer memory, and the timing field adder 320, the determiner 330, and the packet storer 340; may be implemented in software or firmware executing within a processor included in the apparatus; however, these elements may, instead, be implemented in hardware. Furthermore, the receiving mechanism 750 may be, for example, a computer memory, and the comparer 710 and the remover 730 may be implemented in software or firmware executing within a processor included in the apparatus 700; however, these elements may, instead, be implemented in hardware.

The elements of storage and retrieval apparatus 900 perform the functions of corresponding elements in the previously described embodiments of the present invention in order to achieve storage and retrieval of multimedia data.

Figure 10A:
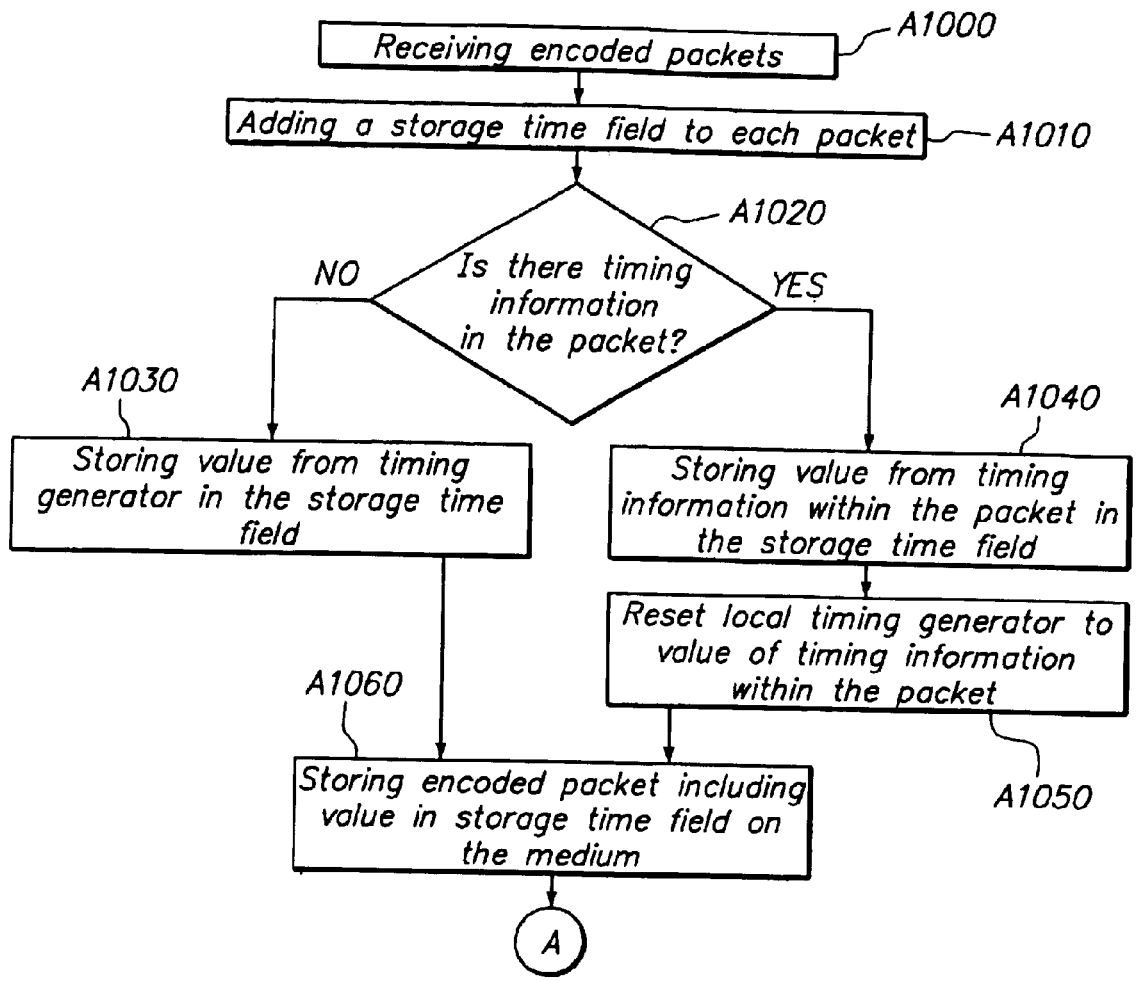
FIGS. 10A and 10B are flow charts of a method of storing information on a medium and retrieving the stored information for playback.
Figure 10B:
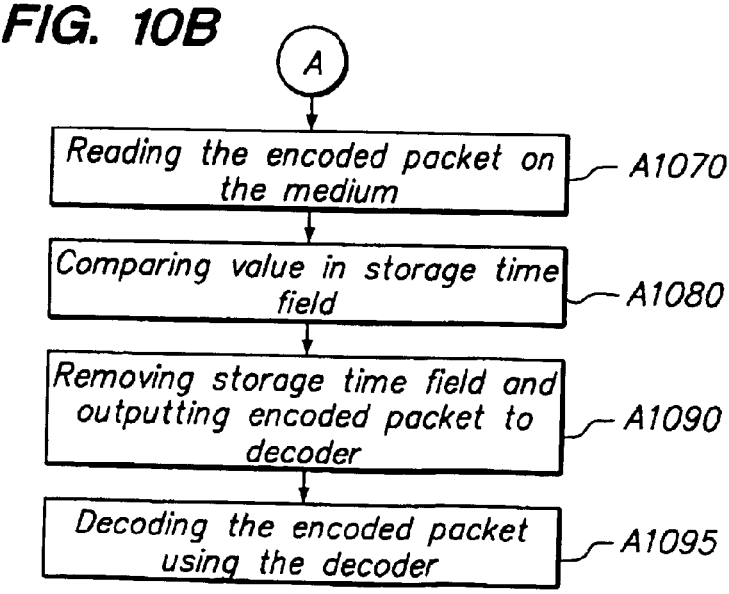

FIGS. 10A and 10B explain the processing performed in the embodiment of FIG. 9.

In a first act A1000, storage area 310 receives encoded packets 105 of multimedia information from an encoder. In a second act A1010, timing field adder 320 adds and timing field storer 322 stores a timing field 324 to the each packet 105 received in storage area 310.

While the illustrated embodiment attaches timing field 324 to the front of each packet 105, timing field 324 may be attached in any appropriate position.

For each packet 105, determiner 330 reviews the contents of packet 105 to identify whether packet 105 contains timing information in a next act A1020. If packet 105 does not contain the timing information, time field storer 322 sets timing field 324 to the corresponding value in storage timing generator 360 in a next act A1030.

If packet 105 does contain timing information, two actions occur. First, timing field 324 is set to the value from the timing information in packet 105 in a next act A1040.

Second, storage timing generator 360 is reset to the timing information value in packet 105 in a further act A1050. Note that acts A1040 and A1050 can occur simultaneously or sequentially.

Once timing field 324 contains the appropriate value, packet 105 is stored in medium 950 in a next act A1060 by packet storer 340. The medium 950 may comprise any of the media forms described earlier.

When retrieval of the stored information is desired, receiving mechanism 750 reads encoded packets 105, including timing field 324, from the medium 950 in a next act A1070. Retrieval timing generator 720 initially sets the value in timing field 324 to the value of the first packet read. As packets 105 are read from medium 950, comparer 710 compares the value in timing field 324 of each packet 105 with the value in retrieval timing generator 720 in a next act A1080. When comparer 710 finds that the value in one of the timing fields 324 is a predetermined amount less than the value in retrieval timing generator 720, comparer 710 indicates to remover 730 that transmission time for packet 105 has been reached. In a next act A1090, remover 730 removes timing field 324 from the packet 105 and outputs the packet 105 to decoder 740 in an act A1095.

While the invention has been described by way of example embodiments, it is understood that the words which have been used herein are words of descriptions, rather than words of limitation. Changes may be made, within the purview of the appended claims, without departing from the scope and spirit of the invention in its broader aspects. Although the invention has been described herein with reference to particular structures, materials, and embodiments, it is understood that the invention is not limited to the particulars disclosed. The invention extends to all equivalent structures, mechanisms, acts, and uses, such as are within the scope of the appended claims.

We claim as our invention:

1. A method for storing multimedia information on a medium, comprising:

receiving encoded packets of the multimedia information, a subset of the encoded packets including timing information arriving at least every predetermined time period;

adding storage timing fields to respective corresponding encoded packets;

when a corresponding encoded packet does not include the timing information, storing a value from a timing generator into a given storage timing field;

when the corresponding encoded packet includes the timing information, storing a value from the timing information of the corresponding encoded packet into the given storage timing field and resetting the value in the timing generator; and storing the corresponding encoded packet onto the medium.

2. The method of claim 1, wherein the received encoded packets are in an MPEG2 format.

3. The method of claim 1, wherein the storage timing field includes a 42 bit timing value.

4. The method of claim 1, wherein the predetermined time period is 100 milliseconds.

5. The method of claim 1, wherein the resetting of the value in the timing generator comprises setting the timing generator to the value in the timing information.

6. An apparatus for storing multimedia information on a medium, comprising:

a storage area for storing a received encoded packet of a plurality of encoded packets, the encoded packets including the multimedia information, and a subset of the encoded packets including timing information arriving at least every predetermined time period;

a timing field adder to add a storage timing field to the encoded packet in the storage area;

a timing generator;

a determiner to determine whether the encoded packet in the storage area includes the timing information; and a packet storer for storing the encoded packet, including the storage timing field, onto the medium, wherein:

the timing field adder includes a timing field storer for reading and storing a value of the timing information into the storage timing field and resetting a value in the timing generator when the determiner determines that the encoded packet in the storage area includes the timing information, and the timing field storer for reading and storing the value of the timing generator into the storage timing field when the determiner determines that the encoded packet in the storage area does not include the timing information.

7. The apparatus of claim 6, wherein the received encoded packet is in an MPEG2 format.

8. The apparatus of claim 6, wherein the storage timing field includes a 42 bit timing value.

9. The apparatus of claim 6, wherein the predetermined time period is 100 milliseconds.

10. The apparatus of claim 6, wherein when the timing field storer resets the value in the timing generator, the timing generator is reset to the value in the timing information.

11. A method for storing and retrieving multimedia information, comprising:

receiving encoded packets of the multimedia information, a subset of the encoded packets including timing information arriving at least every predetermined time period;

adding storage timing fields to respective corresponding encoded packets;

when the corresponding encoded packet does not include the timing information, storing a value from a receive timing generator into a given storage timing field;

when the corresponding encoded packet includes the timing information, storing a value from the timing information of the corresponding encoded packet into the given storage timing field and resetting the value in the receive timing generator; and storing the corresponding encoded packet onto a medium;

reading a signal recorded on the medium, the signal representing encoded packets of multimedia information;

comparing a value in a given storage timing field of a respective read corresponding encoded packet to a value from a send timing generator; and removing the given storage timing field from the read respective corresponding encoded packet and outputting the respective corresponding encoded packet to a decoder when the act of comparing indicates that a respective transmission time has been reached.

12. The method of claim 11, wherein the received respective corresponding encoded packet and the outputted respective corresponding encoded packet are in an MPEG2 format.

13. The method of claim 11, wherein the storage timing fields include a 42 bit timing value.

14. The method of claim 11, wherein the predetermined time period is 100 milliseconds.

15. The method of claim 11, wherein the respective transmission time is a time which is a second predetermined time period earlier than a time indicated by the value in the respective storage timing field.

16. An apparatus for storing multimedia information to a medium and retrieving the multimedia information from the medium, the apparatus comprising:

a storage area for storing a received encoded packet of a plurality of encoded packets, the encoded-packets including the multimedia information, and a subset of the encoded packets including timing information arriving at least every predetermined time period;

a timing field adder to add a storage timing field to the encoded packet in the storage area;

a receive timing generator;

a determiner to determine whether the encoded packet in the storage area includes the timing information;

a packet storer for storing the encoded packet, including the storage timing field, onto the medium;

a receiver for receiving a read signal from the medium, the signal representing the encoded packet of multimedia information, the encoded packet including the storage timing field;

a send timing generator;

a comparer for comparing the value in the storage timing field to a timing value from the send timing generator; and a remover for removing the storage timing field from the encoded packet and outputting the encoded packet to a decoder when the comparer indicates that a respective transmission time has been reached, wherein:

the timing field adder includes a timing field storer for reading and storing a value of the timing information into the storage timing field and resetting a value in the receive timing generator when the determiner determines that the encoded packet in the storage area includes the timing information, and the timing field storer for reading and storing the value of the receive timing generator into the storage timing field when the determiner determines that the encoded packet in the storage area does not include the timing information.

17. The apparatus of claim 16, wherein the received encoded packet and the outputted encoded packet are in an MPEG2 format.

18. The apparatus of claim 16, wherein the storage timing field includes a 42 bit timing value.

19. The apparatus of claim 16, wherein the predetermined time period is 100 milliseconds.

20. The apparatus of claim 16, wherein the respective transmission time is a time which is a second predetermined time period earlier than a time indicated by the value in the respective storage timing field.

21. The apparatus of claim 16, wherein when the timing field adder resets the value in the receive timing generator, the receive timing generator is reset to the value of the timing information.

22. A machine-readable medium having recorded therein machine-readable information, such that when the machine-readable information is read and executed by a processor within a storage device for storing multimedia information, the processor is caused to direct the storage device to:

receive encoded packets of the multimedia information, a subset of the encoded packets to include timing information arriving at least every predetermined time period;

add storage timing fields to respective corresponding encoded packets;

when the corresponding encoded packet does not include the timing information, store a value from a timing generator into a given storage timing field;

when the corresponding encoded packet includes the timing information, store a value from the timing information of the corresponding encoded packet into the given storage timing field and reset the value in the timing generator; and store the encoded packet onto the medium.

23. The machine-readable medium of claim 22, wherein the received encoded packets are in an MPEG2 format.

24. The machine-readable medium of claim 22, wherein the given storage timing field includes a 42 bit timing value.

25. The machine-readable medium of claim 22, wherein the predetermined period is 100 milliseconds.

26. The method of claim 1, wherein the received encoded packets are transmitted in a transport stream.

27. The method of claim 1, wherein the subset of the encoded packets include a program clock reference field that carries the timing information, and another subset of the encoded packets exclude a program clock reference field that carries the timing information.

28. The method of claim 1, wherein the storage timing fields are appended to the beginning of the respective corresponding encoded packets.

29. The method of claim 1, wherein the predetermined time period does not exceed 100 milliseconds.

30. The method of claim 1, wherein the multimedia information includes video content.

31. The method of claim 1, wherein the multimedia information includes audio content.

32. The method of claim 1, wherein the medium is a hard disk.

33. The method of claim 1, wherein the medium is an optical isk.

34. The method of claim 1, wherein the medium is a magnetic tape.

35. The method of claim 1, wherein the medium is a writable CD.

36. The apparatus of claim 6, wherein the received encoded packet is transmitted in a transport stream.

37. The apparatus of claim 2, wherein the subset of the encoded packets include a program clock reference field that carries the timing information, and another subset of the encoded packets exclude a program clock reference field that carries the timing information.

38. The apparatus of claim 2, wherein the storage timing field is appended to the beginning of the encoded packet.

39. The apparatus of claim 6, wherein the predetermined time period does not exceed 100 milliseconds.

40. The apparatus of claim 6, wherein the multimedia information includes video content.

41. The apparatus of claim 6, wherein the multimedia information includes audio content.

42. The apparatus of claim 6, wherein the medium is a hard disk.

43. The apparatus of claim 6, wherein the medium is an optical disk.

44. The apparatus of claim 6, wherein the medium is a magnetic tape.

45. The apparatus of claim 6, wherein the medium is a writable CD.

46. The method of claim 11, wherein the received encoded packets are transmitted in a transport stream.

47. The method of claim 11, wherein the subset of the encoded packets include a program clock reference field that carries the timing information, and another subset of the encoded packets exclude a program clock reference field that carries the timing information.

48. The method of claim 11, wherein the storage timing fields are appended to the beginning of the respective corresponding encoded packets.

49. The method of claim 11, wherein the predetermined time period does not exceed 100 milliseconds.

50. The method of claim 11, wherein the multimedia information includes video content.

51. The method of claim 11, wherein the multimedia information includes audio content.

52. The method of claim 11, wherein the medium is a hard disk.

53. The method of claim 11, wherein the medium is an optical disk.

54. The method of claim 11, wherein the medium is a magnetic tape.

55. The method of claim 11, wherein the medium is a writable CD.

56. The apparatus of claim 16, wherein the received encoded packet is transmitted in a transport stream.

57. The apparatus of claim 16, wherein the subset of the encoded packets include a program clock reference field that carries the timing information, and another subset of the encoded packets exclude a program clock reference field that carries the timing information.

58. The apparatus of claim 16, wherein the storage timing field is appended to the beginning of the encoded packet.

59. The apparatus of claim 16, wherein the predetermined time period does not exceed 100 milliseconds.

60. The apparatus of claim 16, wherein the multimedia information includes video content.

61. The apparatus of claim 16, wherein the multimedia information includes audio content.

62. The apparatus of claim 16, wherein the medium is a hard disk.

63. The apparatus of claim 16, wherein the medium is an optical disk.

64. The apparatus of claim 16, wherein the medium is a magnetic tape.

65. The apparatus of claim 16, wherein the medium is a writable CD.

66. The machine-readable medium of claim 22, wherein the received encoded packets are transmitted in a transport stream.

67. The machine-readable medium of claim 22, wherein the subset of the encoded packets include a program clock reference field that carries the timing information, and another subset of the encoded packets exclude a program clock reference field that carries the timing information.

68. The machine-readable medium of claim 22, wherein the storage timing fields are appended to the beginning of the respective corresponding encoded packets.

69. The machine-readable medium of claim 22, wherein the predetermined time period does not exceed 100 milliseconds.

70. The machine-readable medium of claim 22, wherein the multimedia information includes video content.

71. The machine-readable medium of claim 22, wherein the multimedia information includes audio content.

72. The machine-readable medium of claim 22, wherein the medium is a hard disk.

73. The machine-readable medium of claim 22, wherein the medium is an optical disk.

74. The machine-readable medium of claim 22, wherein the medium is a magnetic tape.

75. The machine-readable medium of claim 22, wherein the medium is a writable CD.

* * * * *